United States Patent
Murakami

(10) Patent No.: US 7,061,193 B2
(45) Date of Patent: Jun. 13, 2006

(54) MOTOR DRIVE APPARATUS

(75) Inventor: Maki Murakami, Soraku-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 4 days.

(21) Appl. No.: 10/960,092

(22) Filed: Oct. 8, 2004

(65) Prior Publication Data

US 2005/0162107 A1   Jul. 28, 2005

(30) Foreign Application Priority Data

Jan. 28, 2004 (JP) ............................ 2004-020358

(51) Int. Cl.
*H02K 23/00* (2006.01)

(52) U.S. Cl. ................. 318/254; 318/138; 318/439

(58) Field of Classification Search ............... 318/254, 318/138, 439, 599, 811; 369/13.27
See application file for complete search history.

(56) References Cited

U.S. PATENT DOCUMENTS

2002/0191498 A1* 12/2002 Nishida et al. .......... 369/13.22
2004/0189221 A1* 9/2004 Kurosawa et al. .......... 318/254

FOREIGN PATENT DOCUMENTS

JP         2002-010678         1/2002

* cited by examiner

*Primary Examiner*—Karen Masih
(74) *Attorney, Agent, or Firm*—McDermott Will & Emery LLP

(57) ABSTRACT

A position detection section 10 outputs a position signal 101 indicating the relative position between motor windings L1 to L3 and a rotor 60. A crossing detection section 20a outputs a rotation signal 241 indicating the magnitude relation between the position signal 101 and a reference signal 102. An energization control signal generation section 30 generates, based on the rotation signal 241, energization control signals 301 for the motor windings L1 to L3. An edge signal 221 is outputted when the magnitude relation of the two signals is reversed, and a mask signal 231 is outputted over a predetermined period of time from when the edge signal 221 is outputted. While the mask signal 231 is being outputted, the crossing detection section 20a continuously outputs, as the rotation signal 241, a comparison result signal 211 which had been inputted before the mask signal 231 was outputted.

20 Claims, 10 Drawing Sheets

MOTOR DRIVE APPARATUS

BACKGROUND OF THE INVENTION

1. Field of the Invention

The present invention relates to a motor drive apparatus, and more particularly to a motor drive apparatus which detects the relative position between motor windings and a rotor and continuously controls the rotation of a motor.

2. Description of the Background Art

Motor drive apparatuses obtain a position signal which indicates the relative position between motor windings and a rotor, obtain a rotation signal which indicates the magnitude relation between the position signal and the reference value of the position signal, and continuously control the power to be supplied to the motor based on the rotation signal. Here, the noise generated in the motor drive apparatus may interfere the position signal and chattering may occur in the rotation signal. In order to prevent chattering which occurs in the rotation signal, conventional motor drive apparatuses employ a method of eliminating noise which is contained in the position signal, using a low-pass filter or a method of making a comparison between the position signal and the reference value using a comparator having hysteresis.

FIG. 9 is a diagram showing the configuration of a conventional motor drive apparatus. A motor drive apparatus 9 shown in FIG. 9 includes a position detection section 10; a crossing detection section 29, an energization control signal generation section 30; a pulse width modulation (hereinafter referred to as "PWM") signal generation section 40; a gate circuit 50; and power transistors Q1 to Q6. The motor drive apparatus 9 employs a method of making a comparison between the position signal and the reference value using the crossing detection section 29 having hysteresis.

In FIG. 9, the position detection section 10 detects the relative position between motor windings L1 to L3 and a rotor 60 and outputs a position signal 101 which indicates the result of the detection. The position signal 101 and a reference signal 102 which indicates the reference level of the position signal 101 are inputted to the crossing detection section 29. The crossing detection section 29 makes a comparison between the position signal 101 and the reference signal 102 using a comparator 21 and outputs a rotation signal 291 which indicates the magnitude relation between the position signal 101 and the reference signal 102. The crossing detection section 29 changes the level of the reference signal 102 by a predetermined amount and in a predetermined direction when the magnitude relation between the position signal 101 and the reference signal 102 is reversed. Specifically, when the position signal 101 is greater than the reference signal 102, the level of the reference signal 102 is reduced by a predetermined amount, and when the position signal 101 is smaller than the reference signal 102, the level of the reference signal 102 is increased by a predetermined amount.

The energization control signal generation section 30 outputs, based on the rotation signal 291, energization control signals 301 for sequentially energizing the motor windings L1 to L3. The PWM signal generation section 40 generates a PWM signal 401 having a predetermined time width. The gate circuit 50 computes the logical AND of the energization control signals 301 and the PWM signal 401. The power transistors Q1 to Q6 supply power to the motor windings L1 to L3 based on the energization control signals 301 and the output signals of the gate circuit 50.

FIG. 10 is a signal waveform diagram showing the input and output signals of the crossing detection section 29. As shown in FIG. 10, the position signal 101 is ideally in the form of a sine wave (indicated by a dashed line in FIG. 10) whose amplitude changes periodically in accordance with the rotation of the rotor 60. The reference signal 102 is described assuming that the reference signal 102 is a constant level signal. However, in the actual position signal 101 (indicated by a solid line in FIG. 10), noise having a constant amplitude and period is included.

Therefore, in the case where the crossing detection section 29 does not have hysteresis, chattering occurs in the rotation signal 291 during a period of time before and after the magnitude relation between the position signal 101 and the reference signal 102 is reversed. On the other hand, in the case where the crossing detection section 29 has hysteresis, chattering does not occur in the rotation signal 291 even during the aforementioned period of time. Thus, by using the crossing detection section 29 having hysteresis, it is possible to prevent chattering which occurs in the rotation signal 291.

Further, as another conventional art related to the present invention, Japanese Laid-Open Patent Publication No. 2002-10678 discloses a technique of stably driving a sensorless spindle motor by setting the capacity of a capacitor which is externally mounted on a mask signal generation circuit, to a value suitable for low-speed rotation and high-speed rotation according to a control signal from a controller.

The above-described conventional motor drive apparatuses, however, have the following problems. In the motor drive apparatus which eliminates noise contained in the position signal using a low-pass filer, if the capacity of the capacitor included in the low-pass filter is increased to improve the noise elimination level, the delay time in the low-pass filter increases. This causes a delay in the output of the rotation signal, and as a result, the response to the detected position signal is reduced. In particular, in a high-speed rotation motor, a slight delay time may cause a large phase delay and thus a reduction in response leads to a big problem.

In addition, in the motor drive apparatus which makes a comparison between the position signal and the reference value using a comparator having hysteresis, the rotation signal changes after the lapse of a predetermined delay time (time T1 shown in FIG. 10) from when the magnitude relation between the position signal and the reference signal is reversed. The delay time is determined depending on the hysteresis width of the comparator but not on the number of rotations of the motor. Therefore, in the case where the position signal changes slowly, the delay time becomes longer, resulting in a delay in the output of the rotation signal. In addition, in the case where there are variations in the characteristics (e.g., a hysteresis width) of the comparator, variations also occur in a rotation signal to be outputted from the comparator. Further, in the case where the hysteresis width is smaller than the level of noise, chattering occurs in the rotation signal, and thus the level of noise needs to be pre-estimated when determining the hysteresis width of the comparator.

SUMMARY OF THE INVENTION

Therefore, an object of the present invention is to provide a motor drive apparatus which has a quick response to a position signal and prevents chattering which occurs in a rotation signal. In addition, another object of the present invention is to prevent a motor drive apparatus which is capable of freely changing the timing at which the rotation signal changes.

The present invention has the following features to attain the objects mentioned above.

A motor drive apparatus of the present invention comprising: a position detection section for detecting a relative position between motor windings of a plurality of phases and a rotor which are included in the motor to be controlled, and outputting a position signal; a crossing detection section for making a comparison between the position signal and a reference level of the position signal, and outputting a rotation signal which indicates a magnitude relation between the position signal and the reference level; an energization control signal generation section for generating, based on the rotation signal, energization control signals for sequentially energizing the motor windings of a plurality of phases; a pulse width modulation signal generation section for generating a pulse width modulation signal having a predetermined time width; a gate circuit for performing a logical operation on the energization control signals and the pulse width modulation signal; and a plurality of power transistors for supplying power to the motor windings of a plurality of phases based on the energization control signals and output signals of the gate circuit. The crossing detection section includes: a comparator for making a comparison between the position signal and the reference level, and outputting an interim rotation signal which indicates the magnitude relation between the position signal and the reference level; a mask signal generation section for outputting a mask signal over a predetermined mask time from when the magnitude relation between the position signal and the reference level is reversed; and an output signal holding section for outputting the interim rotation signal as the rotation signal when the mask signal is not outputted, holding the interim rotation signal therein when an output of the mask signal is started, and outputting the signal held therein as the rotation signal when the mask signal is being outputted. According to such a motor drive apparatus, when chattering occurs in the rotation signal, a mask signal is generated so that the rotation signal does not change, and thus chattering which occurs in the rotation signal can be prevented without reducing a response to the position signal.

In this case, the crossing detection section may further include an edge signal generation section for outputting an edge signal when the interim rotation signal is changed, and the mask signal generation section may output the mask signal over the mask time from when the edge signal is outputted. By this, the crossing detection section can be easily configured.

The mask signal generation section may measure the mask time using a clock signal to be provided or a delay circuit for delaying a signal by a predetermined time. By this, the mask time can be set to any value. Alternatively, the mask time in the mask signal generation section may be set in accordance with a frequency of the position signal. By this, the mask time can be set to any suitable value.

The crossing detection section may further include an output signal delay section for delaying an output of the rotation signal by a predetermined delay time. By this, the timing at which the rotation signal changes can be freely changed. In this case, the output signal delay section may measure the delay time using a clock signal to be provided or a delay circuit for delaying a signal by a predetermined time. By this, the delay time can be set to any value. Alternatively, the delay time in the output signal delay section may be set in accordance with a frequency of the position signal. By this, the delay time can be set to any suitable value.

The mask signal generation section may generate the mask signal over a predetermined period of time commencing from before the pulse width modulation signal is outputted and ending after the pulse width modulation signal is outputted. By this, even in the case where PWM noise is included in the position signal, chattering which occurs in the rotation signal can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
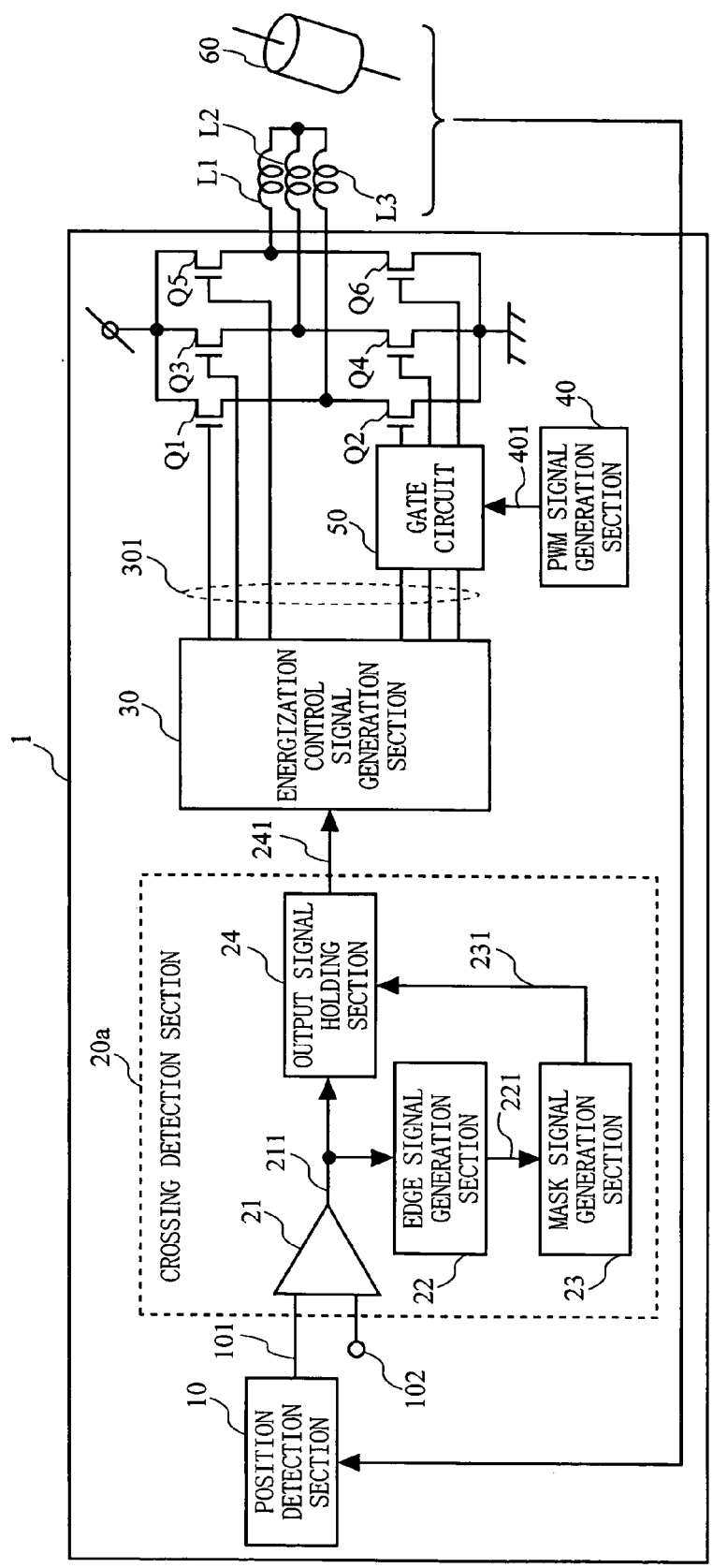
FIG. 1 is a diagram showing the configuration of a motor drive apparatus according to a first embodiment of the present invention.

FIG. 1 is a diagram showing the configuration of a motor drive apparatus according to a first embodiment of the present invention. A motor drive apparatus 1 shown in FIG. 1 includes a position detection section 10; a crossing detection section 20a, an energization control signal generation section 30; a PWM signal generation section 40; a gate circuit 50; and power transistors Q1 to Q6. The motor drive apparatus 1 continuously controls the rotation of a motor having motor windings L1 to L3 of a plurality of phases and a rotor 60.

In FIG. 1, the position detection section 10 detects the relative position between the motor windings L1 to L3 and the rotor 60 and outputs a position signal 101 which indicates the result of the detection. The position signal 101 is inputted to the crossing detection section 20a. In addition to the position signal 101, a reference signal 102 which indicates the reference level of the position signal 101 is inputted to the crossing detection section 20a. Specifically, the reference signal 102 is a signal indicating the alternating-current zero point of the position signal 101. Here, in the case where the motor is driven without using a sensor, the alternating-current zero point of the position signal 101 is the midpoint potential of the position signal 101, and in the case where the motor is driven using a sensor, the alternating-current zero point of the position signal 101 is the potential of the crossing point of two antiphase position signals outputted from the Hall sensor. The reference signal 102 may be generated inside the motor drive apparatus 1 based on the position signal 101 or may be inputted from the outside of the motor drive apparatus 1.

Figure 2:
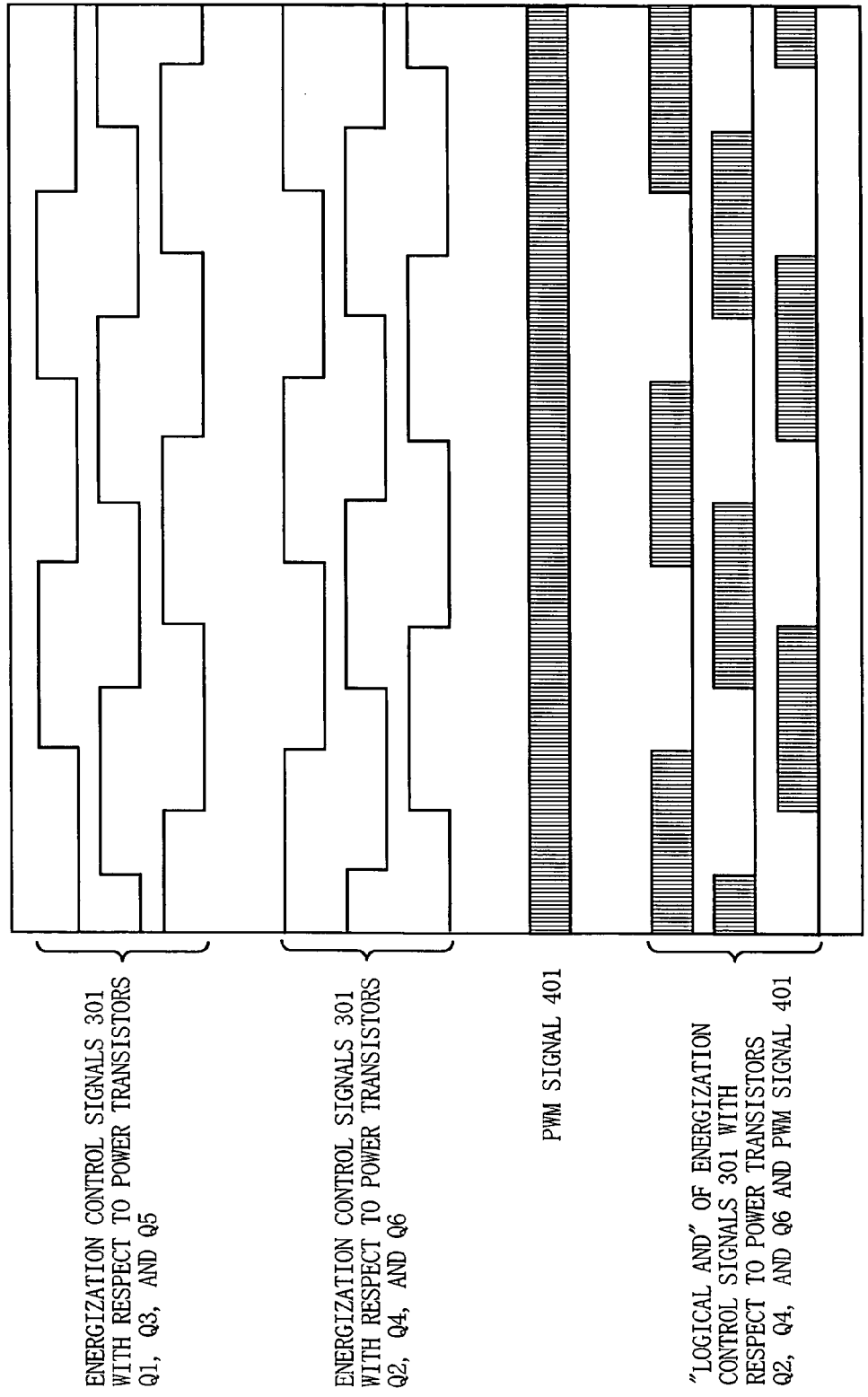
FIG. 2 is a signal waveform diagram showing energization control signals in the motor drive apparatus.

The crossing detection section 20a makes a comparison between the position signal 101 and the reference signal 102 and outputs a rotation signal 241 which indicates the magnitude relation between the position signal 101 and the reference signal 102. The detailed description of the crossing detection section 20a will be provided later. The energization control signal generation section 30 outputs, based on the rotation signal 241, six energization control signals 301 for sequentially energizing the motor windings L1 to L3 (see FIG. 2). The PWM signal generation section 40 generates a PWM signal 401 having a time width which is based on the size of the average motor drive current. The gate circuit 50 computes the logical AND of the energization control signals 301 and the PWM signal 401 (see FIG. 2). Of the six energization control signals 301, three signals are directly inputted to control terminals of the power transistors Q1, Q3, and Q5. The other three energization control signals 301 are inputted to control terminals of the power transistors Q2, Q4, and Q6 through the gate circuit 50.

The power transistors Q1 to Q6 supply power to the motor windings L1 to L3 based on the energization control signals 301 and the output signals of the gate circuit 50. The power transistors Q1 to Q6 may be NPN transistors or PNP transistors, or other types of transistors such as bipolar transistors or MOS transistors. Note that although in the motor drive apparatus 1, the output signals of the gate circuit 50 are inputted to the control terminals of the power transistors Q2, Q4, and Q6, it is also possible to input the output signals of the gate circuit 50 to the control terminals of the power transistors Q1, Q3, and Q5. Alternatively, a gate circuit 50 may be provided both at the front of the power transistors Q2, Q4, and Q6 and at the front of the power transistors Q1, Q3, and Q5 and the output signals of the gate circuit 50 may be inputted to the control terminals of both the upper and lower power transistors in such a manner that the operation timing is shifted between the upper and lower power transistors (which is a so-called "upper/lower chopping method").

The crossing detection section 20a will be described in detail below. As shown in FIG. 1, the crossing detection section 20a includes a comparator 21; an edge signal generation section 22; a mask signal generation section 23; and an output signal holding section 24. The comparator 21 makes a comparison between the position signal 101 and the reference signal 102 and outputs a comparison result signal 211 as an interim rotation signal which indicates the magnitude relation between the position signal 101 and the reference signal 102. The comparator 21 may have or may not have hysteresis.

The edge signal generation section 22 outputs an edge signal 221 when the comparison result signal 211 is changed. In other words, the edge signal generation section 22 outputs an edge signal 221 when the magnitude relation between the position signal 101 and the reference signal 102 is reversed. The mask signal generation section 23 outputs a mask signal 231 over a predetermined period of time (hereinafter referred to as "mask time") from when the edge signal 221 is outputted. The output signal holding section 24 directly outputs the comparison result signal 211 as the rotation signal 241 when the mask signal 231 is not outputted, holds the comparison result signal 211 therein when the output of the mask signal 231 is started, and outputs the signal held therein as the rotation signal 241 when the mask signal 231 is being outputted.

The mask signal generation section 23 may measure the mask time using a clock signal to be provided, for example. Alternatively, the mask signal generation section 23 may measure the mask time using a delay circuit which delays a signal by a predetermined time. By using such a mask signal generation section 23, the mask time can be set to any arbitrary value. In addition, the mask time in the mask signal generation section 23 may be set in accordance with the frequency of the position signal 101. For example, if the frequency of the position signal 101 is f, the mask time may be set to a value less than 1/(2f). By this, the mask time can be set to any suitable value.

Figure 3:
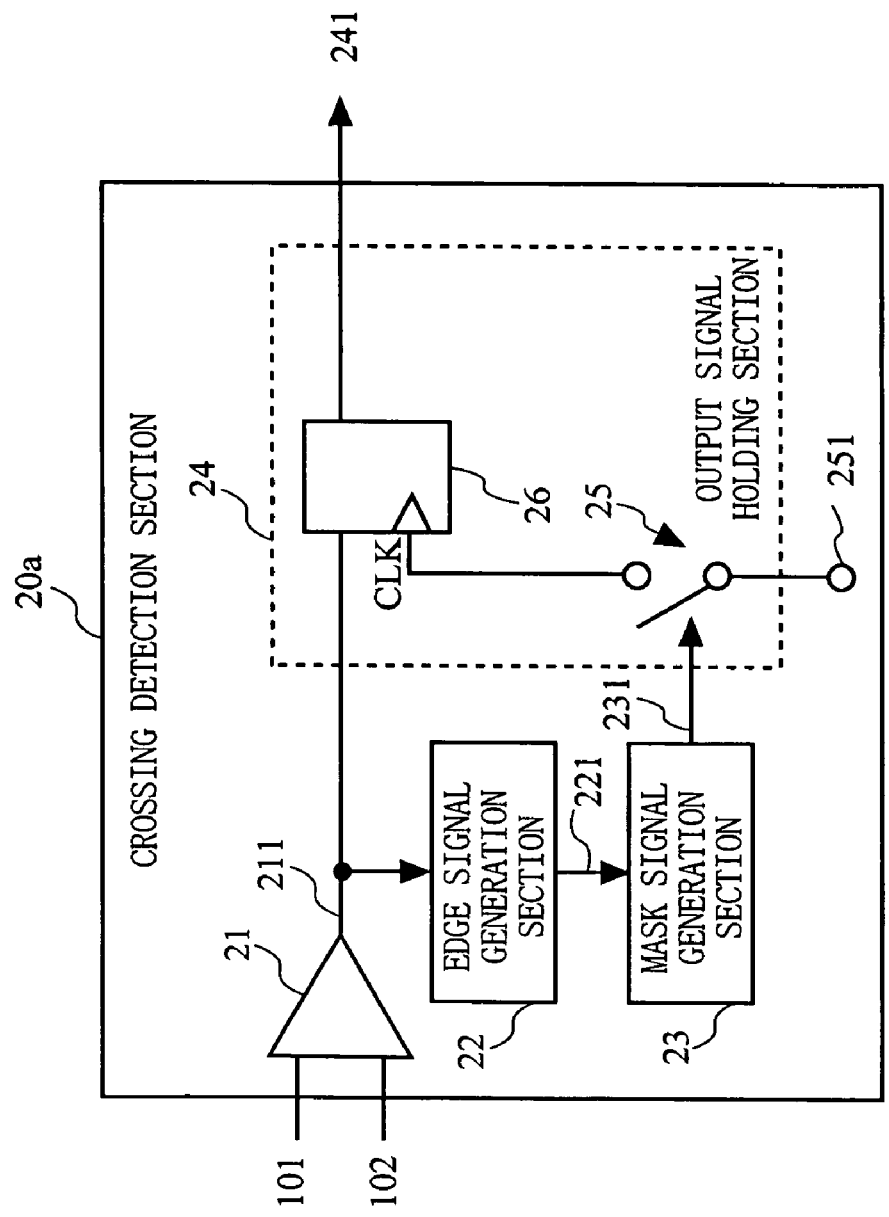
FIG. 3 is a diagram showing a specific exemplary configuration of a crossing detection section of the motor drive apparatus shown in FIG. 1.

FIG. 3 is a diagram showing a specific exemplary configuration of the crossing detection section 20a. As shown in FIG. 3, an output signal holding section 24 has a switch 25 and a flip-flop 26. A clock signal 251 having a frequency higher than that of a position signal 101 is fed to one end of the switch 25. When a mask signal 231 is not outputted, the switch 25 is in continuity, and when the mask signal 231 is being outputted, the switch 25 is in an open state. Thus, when the mask signal 231 is not outputted, the clock signal 251 is fed to the flip-flop 26 and the crossing detection section 20a outputs a rotation signal 241 which changes according to a comparison result signal 211. On the other hand, when the mask signal 231 is being outputted, the clock signal 251 is not fed to the flip-flop 26 and thus the rotation signal 241 does not change. Accordingly, when the mask signal 231 is being outputted, the crossing detection section 20a continuously outputs, as the rotation signal 241, the comparison result signal 211 which had been inputted before the mask signal 231 was outputted.

Figure 4:
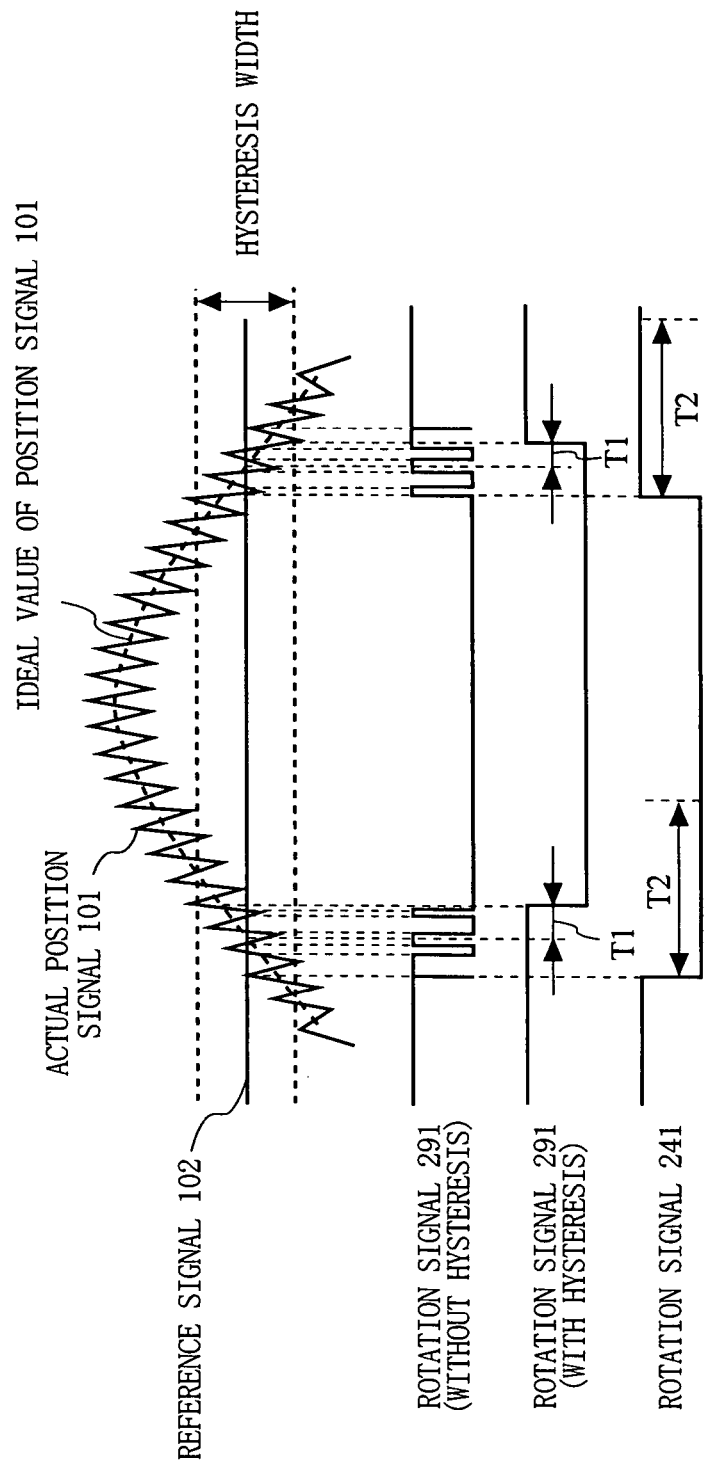
FIG. 4 is a signal waveform diagram showing the input and output signals of the crossing detection section of the motor drive apparatus shown in FIG. 1.
Figure 10:
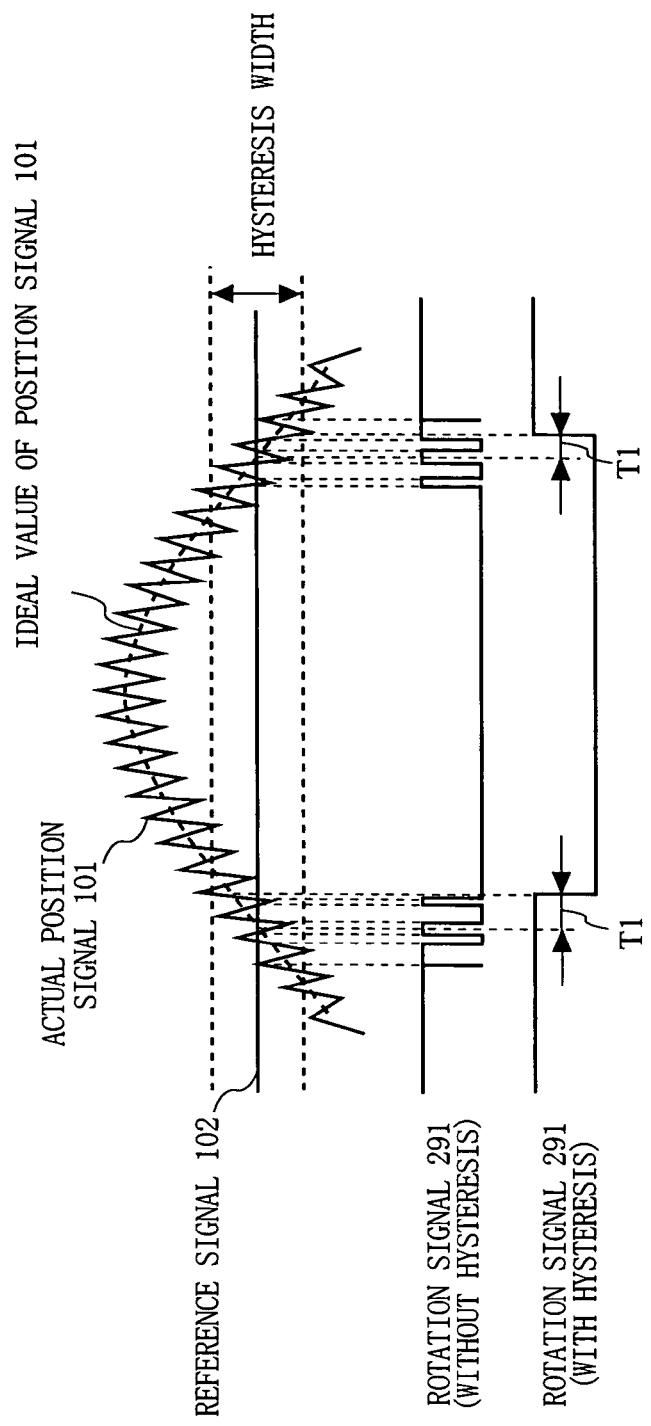
FIG. 10 is a signal waveform diagram showing the input and output signals of a crossing detection section of the conventional motor drive apparatus.

FIG. 4 is a diagram in which the rotation signal 241 outputted from the crossing detection section 20a is added to the signal waveform diagram shown in FIG. 10. As shown in FIG. 4, in the case where the crossing detection section 29 which does not have hysteresis is used, chattering occurs in the rotation signal 291. In the case where the crossing detection section 29 having hysteresis is used, the rotation signal 291 changes so as to be delayed by delay time T1 from when the magnitude relation between the ideal value of the position signal 101 and the reference signal 102 is reversed. On the other hand, the rotation signal 241 outputted from the crossing detection section 20a does not change over a predetermined mask time (T2 shown in FIG. 4) from when the magnitude relation between the ideal value of the position signal 101 and the reference signal 102 is reversed. Therefore, in the motor drive apparatus 1, chattering does not occur in the rotation signal 241. In addition, the rotation signal 241 changes when the magnitude relation between the actual position signal 101 and the reference signal 102 is first reversed, which is before the magnitude relation between the ideal value of the position signal 101 and the reference signal 102 is reversed.

As described above, according to the motor drive apparatus according to the present embodiment, the mask signal is outputted over a predetermined mask time from when the magnitude relation between the position signal and the reference signal is reversed, and the rotation signal does not change while the mask signal is being outputted. Therefore, even if noise is included in the position signal, chattering does not occur in the rotation signal and the rotation signal changes earlier than in the case where the rotation signal is assumed to contain no noise. Hence, according to the motor drive apparatus of the present embodiment, chattering which occurs in the rotation signal can be prevented without reducing a response to the position signal.

Second Embodiment

Figure 5:
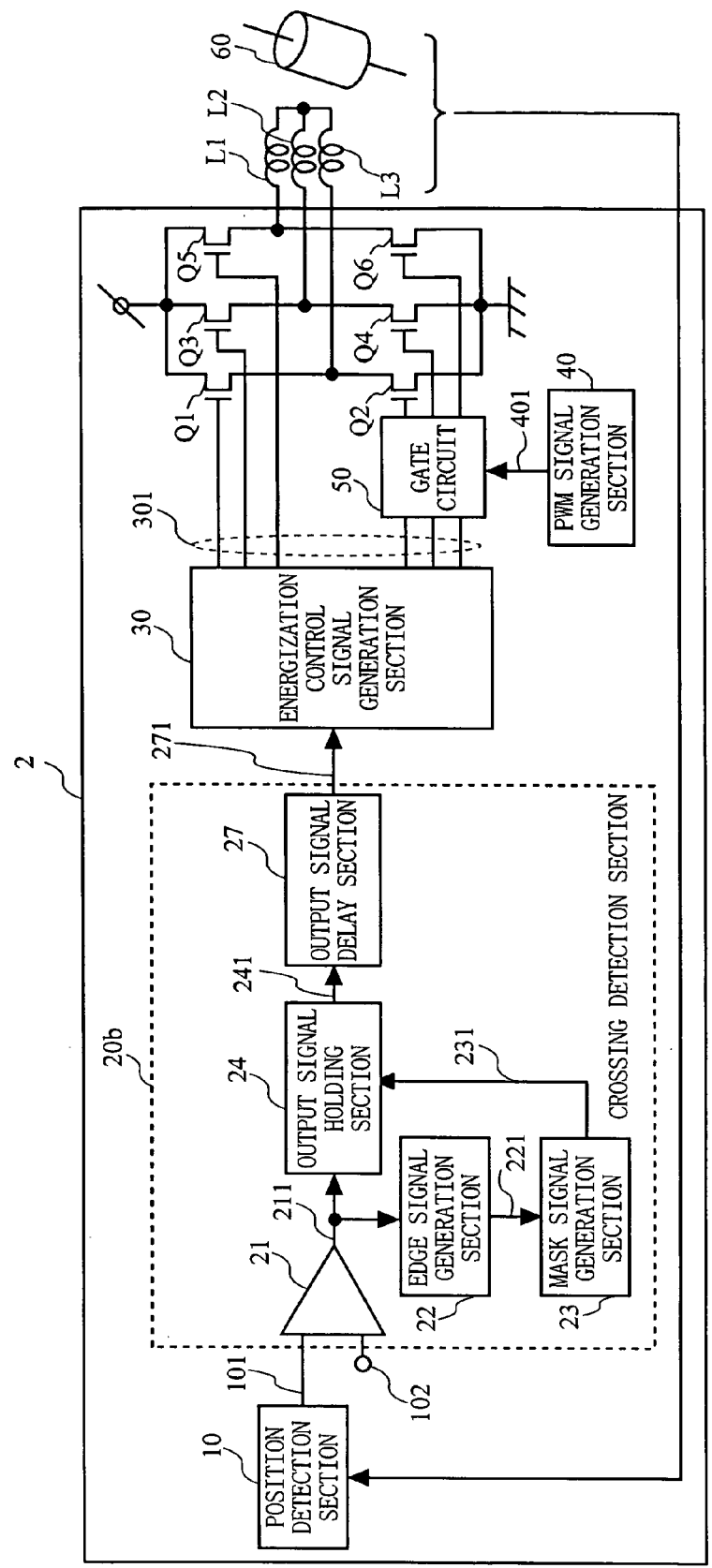
FIG. 5 is a diagram showing the configuration of a motor drive apparatus according to a second embodiment of the present invention.

FIG. 5 is a diagram showing the configuration of a motor drive apparatus according to a second embodiment of the present invention. A motor drive apparatus 2 shown in FIG. 5 is different from the motor drive apparatus 1 (shown in FIG. 1) according to the first embodiment in that the crossing detection section 20a is replaced with a crossing detection section 20b. The crossing detection section 20b is such that an output signal delay section 27 is additionally included in the crossing detection section 20a. Note that among the components of the present embodiment, the same components as those of the first embodiment are designated by the same reference numerals, and the description thereof will be omitted.

The output signal delay section 27 is provided between the output signal holding section 24 and the energization control signal generation section 30 and delays the rotation signal 241 outputted from the output signal holding section 24 by a predetermined delay time. The delay time in the output signal delay section 27 is set to any arbitrary value by a means (not shown) from outside of the motor drive apparatus 1. The output signal of the output signal delay section 27 serves as the rotation signal 271 outputted from the crossing detection section 20b. Note that the output signal delay section 27 may be provided between the position detection section 10 and the comparator 21 or between the comparator 21 and the output signal holding section 24.

The output signal delay section 27 may measure the delay time using a clock signal to be provided, for example. Alternatively, the output signal delay section 27 may measure the delay time using a delay circuit which delays a signal by a predetermined time. By using such an output signal delay section 27, the delay time can be set to any arbitrary value. In addition, the delay time in the output signal delay section 27 may be set in accordance with the frequency of the position signal 101. For example, if the frequency of the position signal 101 is f, the delay time may be set to a value less than 1/(2f). By this, the delay time can be set to any suitable value.

Figure 6:
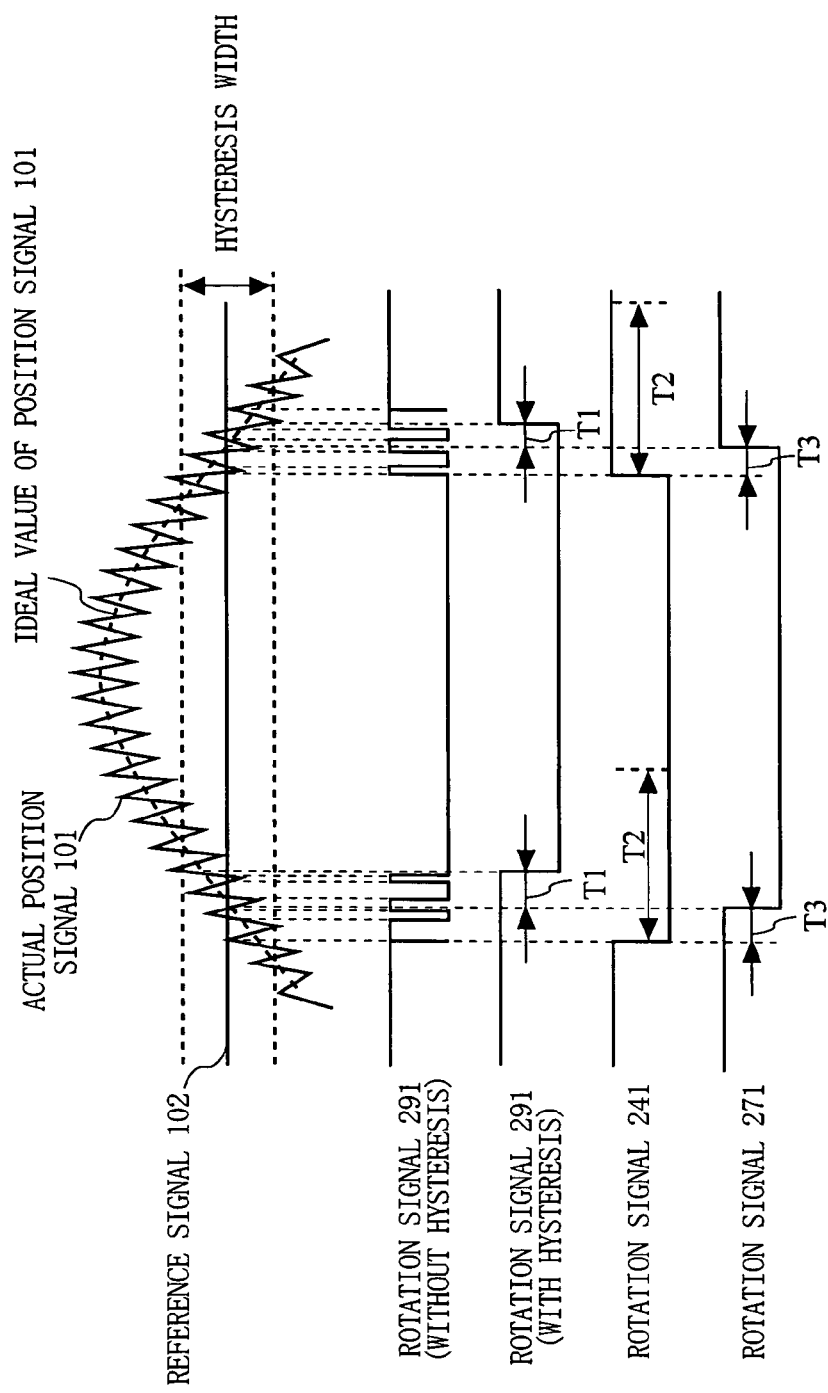
FIG. 6 is a signal waveform diagram showing the input and output signals of a crossing detection section of the motor drive apparatus shown in FIG. 5.

FIG. 6 is a diagram in which the rotation signal 271 outputted from the crossing detection section 20b is added to the signal waveform diagram shown in FIG. 4. As shown in FIG. 6, the rotation signal 271 is delayed from the rotation signal 241 outputted from the crossing detection section 20a according to the first embodiment, by a predetermined delay time T3. Therefore, by setting an appropriate value to the delay time T3, the timing at which the rotation signal 271 changes can be easily changed. For example, the timing at which the rotation signal 271 changes can be changed such that the rotation signal 271 changes when the magnitude relation between the ideal value of the position signal 101 and the reference signal 102 is reversed.

As described above, according to the motor drive apparatus of the present embodiment, chattering which occurs in the rotation signal can be prevented without reducing a response to the position signal, and the timing at which the rotation signal changes can be easily changed.

Third Embodiment

Figure 7:
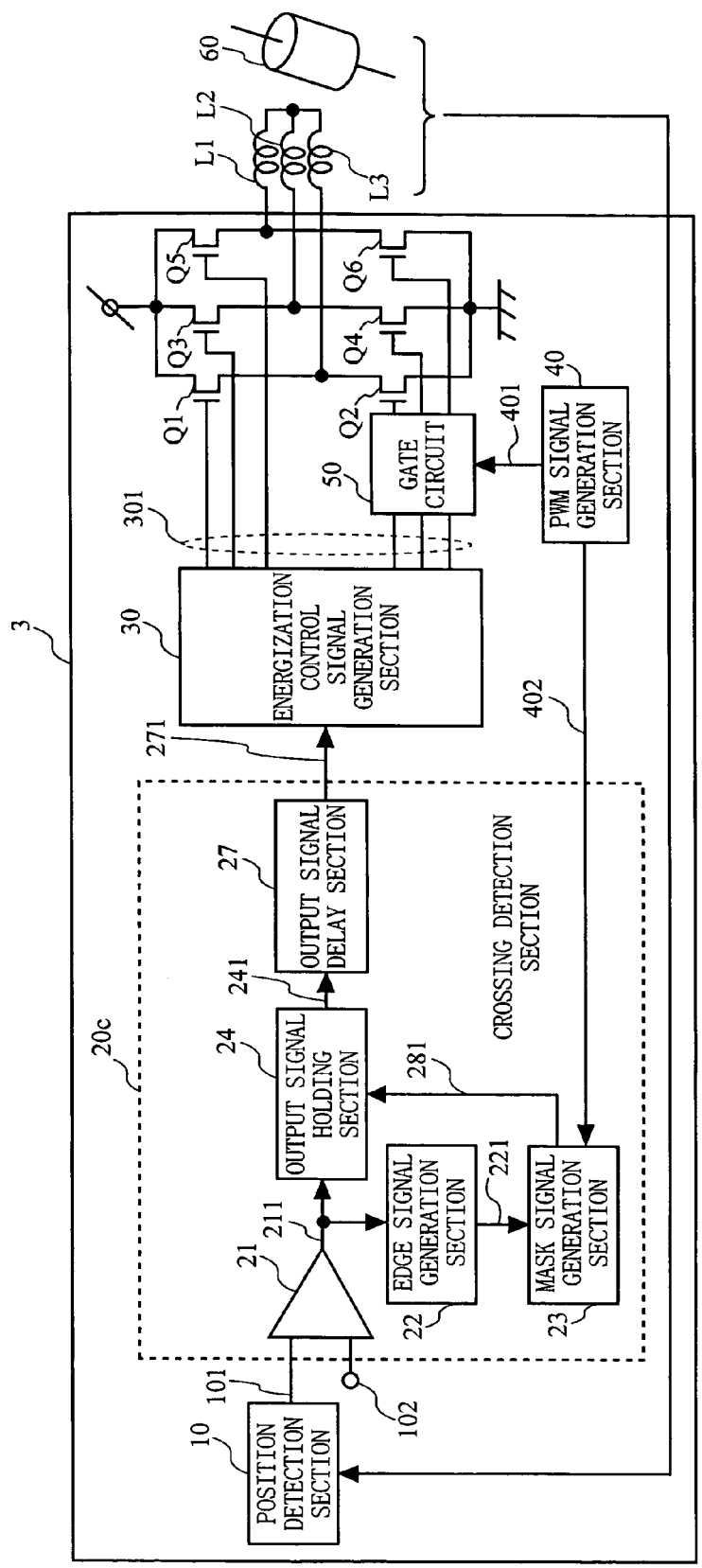
FIG. 7 is a diagram showing the configuration of a motor drive apparatus according to a third embodiment of the present invention.

FIG. 7 is a diagram showing the configuration of a motor drive apparatus according to a third embodiment of the present invention. A motor drive apparatus 3 shown in FIG. 7 is different from the motor drive apparatus 2 (shown in FIG. 5) according to the second embodiment in that the crossing detection section 20b is replaced with a crossing detection section 20c. The crossing detection section 20c is such that the mask signal generation section 23 of the crossing detection section 20b is replaced with a mask signal generation section 28. Note that among the components of the present embodiment, the same components as those of the second embodiment are designated by the same reference numerals, and the description thereof will be omitted.

As in the case with the mask signal generation section 23, the mask signal generation section 28 outputs a mask signal 281 over a predetermined mask time from when an edge signal 221 is outputted. In addition, the mask signal generation section 28 outputs a mask signal 281 over a predetermined period of time commencing from before a PWM signal 401 is outputted and ending after the PWM signal 401 is outputted. More specifically, a PWM signal generation section 40 outputs a timing signal 402 which indicates the timing at which the PWM signal 401 is outputted, and the mask signal generation section 28 outputs a mask signal 281 in accordance with the timing signal 402.

Figure 8:
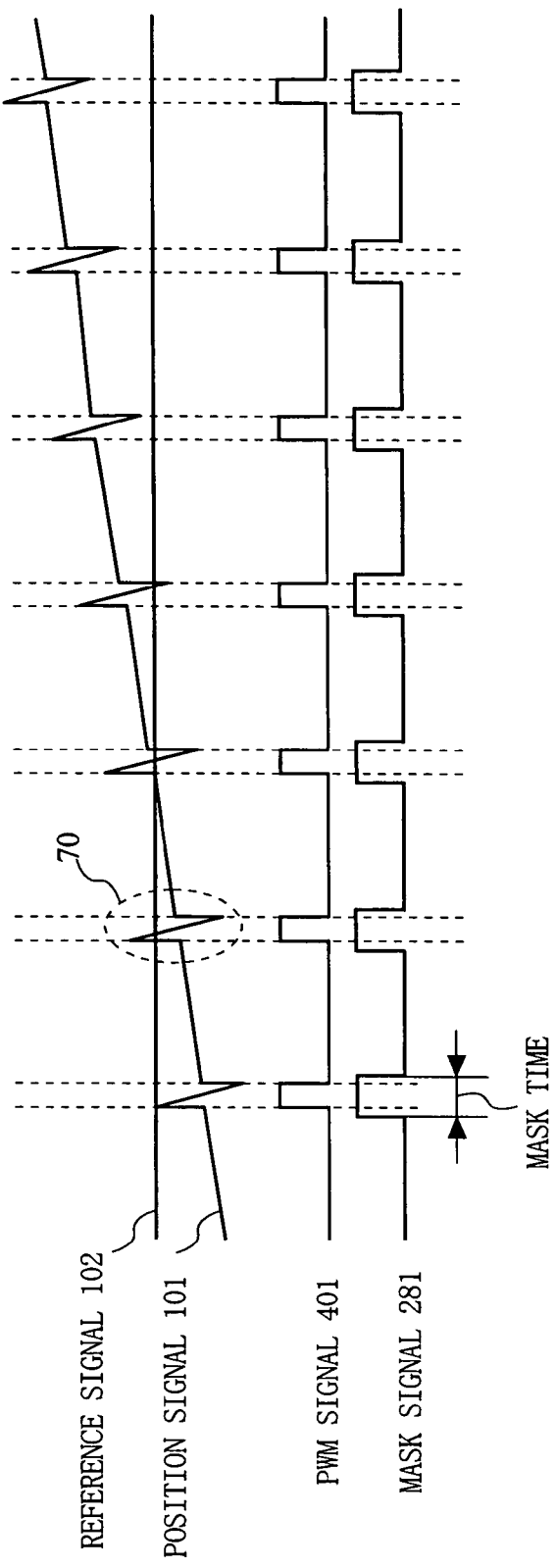
FIG. 8 is a signal waveform diagram showing the timing at which a mask signal is generated in the motor drive apparatus shown in FIG. 7.
Figure 9:
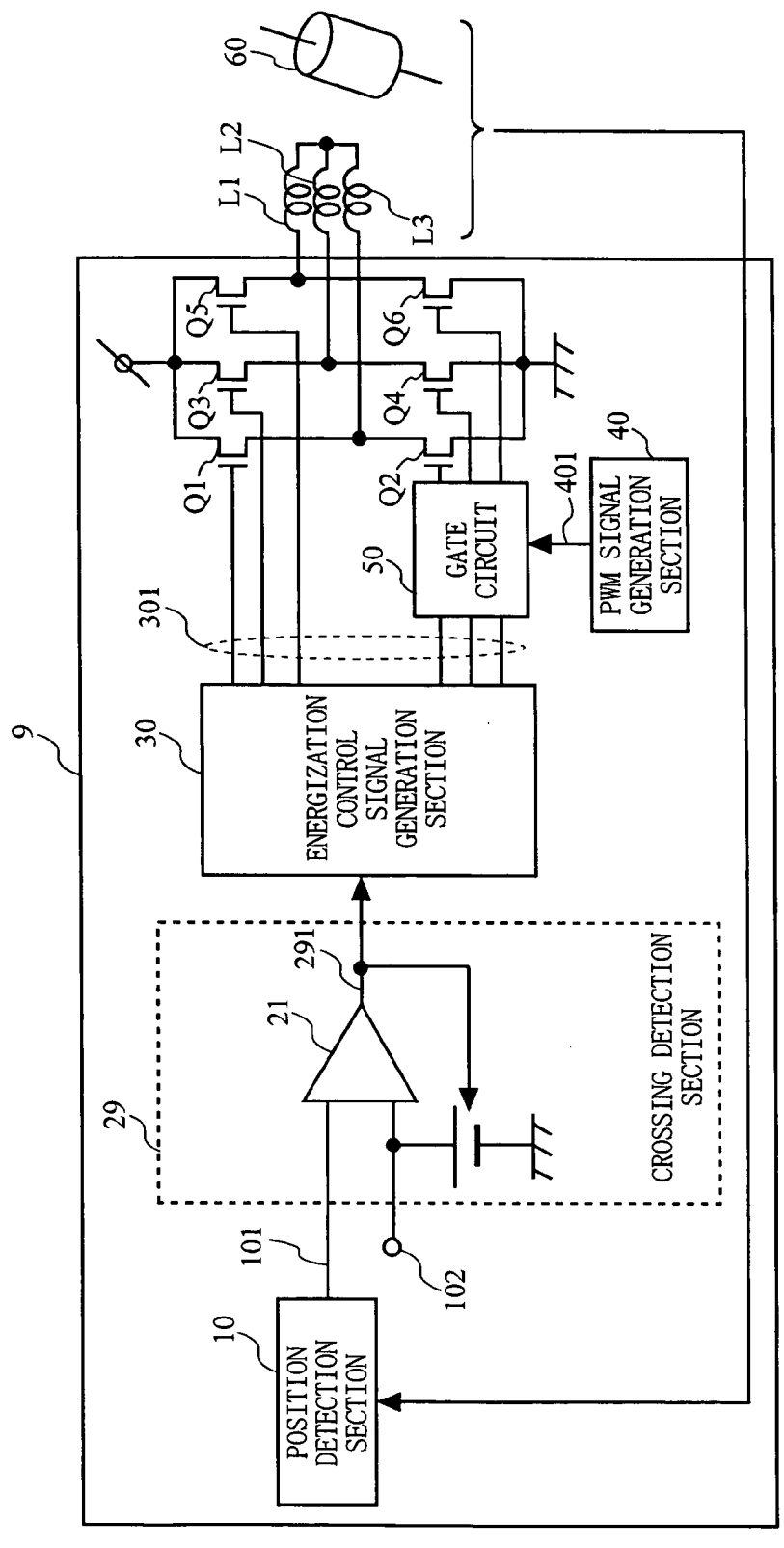
FIG. 9 is a diagram showing the configuration of a conventional motor drive apparatus.

FIG. 8 is a signal waveform diagram showing the timing at which the mask signal 281 is generated. As shown in FIG. 8, when the PWM signal 401 is outputted, the noise called PWM noise 70 is included in the position signal 101. Inclusion of such PWM noise 70 makes chattering more likely to occur in the rotation signal 271. Thus, the mask signal generation section 28 outputs a mask signal 281 over a predetermined period of time commencing from before the PWM signal 401 is outputted and ending after the PWM signal 401 is outputted (see FIG. 8). By this, when the PWM noise 70 is included in the position signal 101, the change of the rotation signal 271 does not take place. Accordingly, even in the case where the PWM noise 70 is included in the position signal 101, chattering occurring in the rotation signal 271 can be prevented.

As described above, according to the motor drive apparatus of the present embodiment, even in the case where the PWM noise is included in the position signal, chattering which occurs in the rotation signal can be prevented without reducing a response to the position signal, and the timing at which the rotation signal changes can be easily changed.

Note that although in the above-described third embodiment the function of outputting the mask signal 281 over a predetermined period of time commencing from before the PWM signal 401 is outputted and ending after the PWM signal 401 is outputted is added to the mask signal generation section 23 included in the motor drive apparatus 2 according to the second embodiment, it is also possible to add such a function to the mask signal generation section 23 included in the motor drive apparatus 1 according to the first embodiment. According to the motor drive apparatus of such a variant of the third embodiment, even in the case where PWM noise is included in the position signal, chattering occurring in the rotation signal can be prevented without reducing a response to the position signal.

The motor drive apparatus of the present invention has an advantageous effect such as the ability of preventing chattering which occurs in the rotation signal without reducing a response to the position signal, and thus can be applied to various motor drive apparatuses such as DVD disk drives, for example.

While the invention has been described in detail, the foregoing description is in all aspects illustrative and not restrictive. It is understood that numerous other modifications and variations can be devised without departing from the scope of the invention.

What is claimed is:

1. A motor drive apparatus for controlling a rotation of a motor, comprising:
   a position detection section for detecting a relative position between motor windings of a plurality of phases and a rotor which are included in the motor to be controlled, and outputting a position signal;
   a crossing detection section for making a comparison between the position signal and a reference level of the position signal, and outputting a rotation signal;
   an energization control signal generation section for generating, based on the rotation signal, energization control signals for sequentially energizing the motor windings of a plurality of phases;
   a pulse width modulation signal generation section for generating a pulse width modulation signal having a predetermined time width;
   a gate circuit for performing a logical operation on the energization control signals and the pulse width modulation signal; and
   a plurality of power transistors for supplying power to the motor windings of a plurality of phases based on the energization control signals and output signals of the gate circuit,
   wherein the crossing detection section includes:
   a comparator for making a comparison between the position signal and the reference level, and outputting a comparison result signal;
   a mask signal generation section for outputting a mask signal over a predetermined mask time from when the comparison result signal is reversed; and
   an output signal holding section for outputting the comparison result signal as the rotation signal when the mask signal is not outputted, holding a level of the comparison result signal inputted when an output of the mask signal is started, and outputting the comparison result signal based on the held level as the rotation signal when the mask signal is being outputted.

2. The motor drive apparatus according to claim 1, wherein
   the crossing detection section further includes an edge signal generation section for outputting an edge signal when the comparison result signal is changed, and
   the mask signal generation section outputs the mask signal over the mask time from when the edge signal is outputted.

3. The motor drive apparatus according to claim 1, wherein the mask signal generation section measures the mask time using a clock signal to be provided.

4. The motor drive apparatus according to claim 1, wherein the mask signal generation section measures the mask time using a delay circuit for delaying a signal by a predetermined time.

5. The motor drive apparatus according to claim 1, wherein the mask time in the mask signal generation section is set in accordance with a frequency of the position signal.

6. The motor drive apparatus according to claim 1, wherein the crossing detection section further includes an output signal delay section for delaying an output of the rotation signal by a predetermined delay time.

7. The motor drive apparatus according to claim 6, wherein the output signal delay section measures the delay time using a clock signal to be provided.

8. The motor drive apparatus according to claim 6, wherein the output signal delay section measures the delay time using a delay circuit for delaying a signal by a predetermined time.

9. The motor drive apparatus according to claim 6, wherein the delay time in the output signal delay section is set in accordance with a frequency of the position signal.

10. The motor drive apparatus according to claim 1, wherein the mask signal generation section generates the mask signal over a predetermined period of time commencing from before the pulse width modulation signal is outputted and ending after the pulse width modulation signal is outputted.

11. A motor drive apparatus controlling method for controlling a rotation of a motor, comprising:
    a position detecting step of detecting a relative position between motor windings of a plurality of phases and a rotor which are included in the motor to be controlled, and outputting a position signal;
    a crossing detecting step of making a comparison between the position signal and a reference level of the position signal, and outputting a rotation signal;
    an energization control signal generating step of generating, based on the rotation signal, energization control signals for sequentially energizing the motor windings of a plurality of phases;
    a pulse width modulation signal generating step of generating a pulse width modulation signal having a predetermined time width;
    a logical operating step of performing a logical operation on the energization control signals and the pulse width modulation signal; and
    a power supplying step of supplying power to the motor windings of a plurality of phases based on the energization control signals and a result of the logical operation,
    wherein the crossing detecting step includes:
    a comparing step of making a comparison between the position signal and the reference level, and outputting a comparison result signal;
    a mask signal generating step of outputting a mask signal over a predetermined mask time from when the comparison result signal is reversed; and
    an output signal holding step of outputting the comparison result signal as the rotation signal when the mask signal is not outputted, holding a level of the comparison result signal inputted when an output of the mask signal is started, and outputting the comparison result sigal based on the held level as the rotation signal when the mask signal is being outputted.

12. A motor drive apparatus controlling method according to claim 11, wherein
    the crossing detecting step further includes an edge signal generating step of outputting an edge signal when the comparison result signal is changed; and
    the mask signal generating step outputs the mask signal over the mask time from when the edge signal is outputted.

13. The motor drive apparatus controlling method according to claim 11, wherein the mask signal generating step measures the mask time using a clock signal to be provided.

14. The motor drive apparatus according to claim 11, wherein the mask signal generating step measures the mask time using a delay circuit for delaying a signal by a predetermined time.

15. The motor drive apparatus controlling method according to claim 11, wherein the mask time in the mask signal generating step is set in accordance with a frequency of the position signal.

16. The motor drive apparatus controlling method according to claim 11, wherein the crossing detecting step further includes an output signal delaying step of delaying an output of the rotation signal by a predetermined delay time.

17. The motor drive apparatus controlling method according to claim 16, wherein the output signal delaying step measures the delay time using a clock signal to be provided.

18. The motor drive apparatus controlling method according to claim 16, wherein the output signal delaying step measures the delay time using a delay circuit for delaying a signal by a predetermined time.

19. The motor drive apparatus controlling method according to claim 16, wherein the delay time in the output signal delay step is set in accordance with a frequency of the position signal.

20. The motor drive apparatus controlling method according to claim 11, wherein the mask signal generating step generates the mask signal over a predetermined period of time commencing from before the pulse width modulation signal is outputted and ending after the pulse width modulation signal is outputted.

* * * * *